(12) United States Patent
Hashiguchi et al.

(10) Patent No.: US 11,807,363 B2
(45) Date of Patent: Nov. 7, 2023

(54) ON-VEHICLE AIRCRAFT CONTROL SYSTEM

(71) Applicant: Mazda Motor Corporation, Hiroshima (JP)

(72) Inventors: Hironobu Hashiguchi, Aki-gun (JP); Akira Yasutake, Aki-gun (JP); Tsuyoshi Arinaga, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 321 days.

(21) Appl. No.: 17/197,162

(22) Filed: Mar. 10, 2021

(65) Prior Publication Data
US 2021/0362856 A1  Nov. 25, 2021

(30) Foreign Application Priority Data
May 19, 2020  (JP) ................. 2020-087575

(51) Int. Cl.
*B64C 39/02*  (2023.01)
*B64U 10/13*  (2023.01)
*B64U 30/20*  (2023.01)
*B64U 80/86*  (2023.01)
*B64U 101/30*  (2023.01)

(52) U.S. Cl.
CPC ............ *B64C 39/024* (2013.01); *B64U 10/13* (2023.01); *B64U 30/20* (2023.01); *B64U 80/86* (2023.01); *B64U 2101/30* (2023.01); *B64U 2201/202* (2023.01)

(58) Field of Classification Search
CPC ...... B64C 39/024; B64U 10/13; B64U 30/20; B64U 80/86; B64U 2201/202; B64U 2101/30
See application file for complete search history.

(56) References Cited

U.S. PATENT DOCUMENTS

2020/0385116 A1* 12/2020 Sabripour ............ G08G 5/0078
2022/0109788 A1*  4/2022 Geissler ................. H04N 23/61

FOREIGN PATENT DOCUMENTS

CN   108700890 A   10/2018
JP   2016-138853 A  8/2016

* cited by examiner

*Primary Examiner* — Peter D Nolan
*Assistant Examiner* — Roy Rhee
(74) *Attorney, Agent, or Firm* — XSENSUS LLP (57) ABSTRACT

An on-vehicle aircraft control system includes a winding device provided on a landing platform, a connecting member connecting the winding device and an aircraft and wound up or drawn out by the winding device, and a controller controlling the winding device and the aircraft. Upon receipt of a landing request to land the aircraft on the landing platform, the controller winds up the connecting member by the winding device and controls an attitude of the aircraft so as to land the aircraft with a photographing unit provided on the aircraft facing in a specified photographing direction determined in advance.

7 Claims, 6 Drawing Sheets

ON-VEHICLE AIRCRAFT CONTROL SYSTEM

CROSS-REFERENCE TO RELATED APPLICATION

The present application claims priority to Japanese App. No. 2020-087575, filed May 19, 2020, the entire contents of which being incorporated herein by reference in its entirety.

TECHNICAL FIELD

The present invention relates to a control system controlling an aircraft that is capable of taking off from and landing on a landing platform provided on a vehicle and includes a photographing unit.

BACKGROUND ART

In recent years, it has been proposed to attach an aircraft to a vehicle in order to photograph surroundings of the vehicle. For example, JP 2016-138853 A discloses a vehicle navigation system that assists a vehicle in traveling by using an aircraft equipped with a camera. In this system, the aircraft is connected to the vehicle with a wire and flies over the vehicle in response to an instruction from a navigation device in the vehicle. The aircraft captures a video including its own vehicle with the camera and transmits captured data to the navigation device. The navigation device analyzes a transmitted image and provides predetermined traveling assistance (for example, assistance for finding a vacant parking space and guiding the own vehicle) based on an analysis result.

As described above, in JP 2016-138853 A, the surroundings are always photographed by the aircraft, which is flying over the vehicle. On the other hand, for example, if it is possible to capture an additional image with the aircraft, which has landed on the vehicle, the aircraft can be used for a wider range of purposes and can be more convenient. However, in this case, it is assumed that a photographing direction will vary depending on an attitude of the aircraft when the aircraft lands. If the photographing direction varies, an image intended by an occupant is more unlikely to be obtained, which makes it difficult to effectively use a photographed image.

SUMMARY OF INVENTION

The present invention has been made in view of the above circumstances, and an object of the present invention is to provide an on-vehicle aircraft control system that can prevent a photographing direction from varying when photographing is performed by an aircraft after landing.

To solve the above problems, the present invention provides an on-vehicle aircraft control system configured to control an aircraft that is capable of taking off from and landing on a landing platform provided on a vehicle and includes a photographing unit, the control system including a winding device provided on the landing platform, a connecting member connecting the winding device and the aircraft and wound up or drawn out by the winding device, and a controller configured to control the winding device and the aircraft, in which upon receipt of a landing request for landing the aircraft on the landing platform, the controller winds up the connecting member by the winding device and controls an attitude of the aircraft for the aircraft to land on the landing platform with the photographing unit facing in a specified photographing direction determined in advance.

DESCRIPTION OF EMBODIMENT

Hereinafter, a preferred embodiment of the present invention will be described in detail with reference to the drawings. The elements with the same reference numerals in different drawings indicate the same or corresponding elements.

Figure 1:
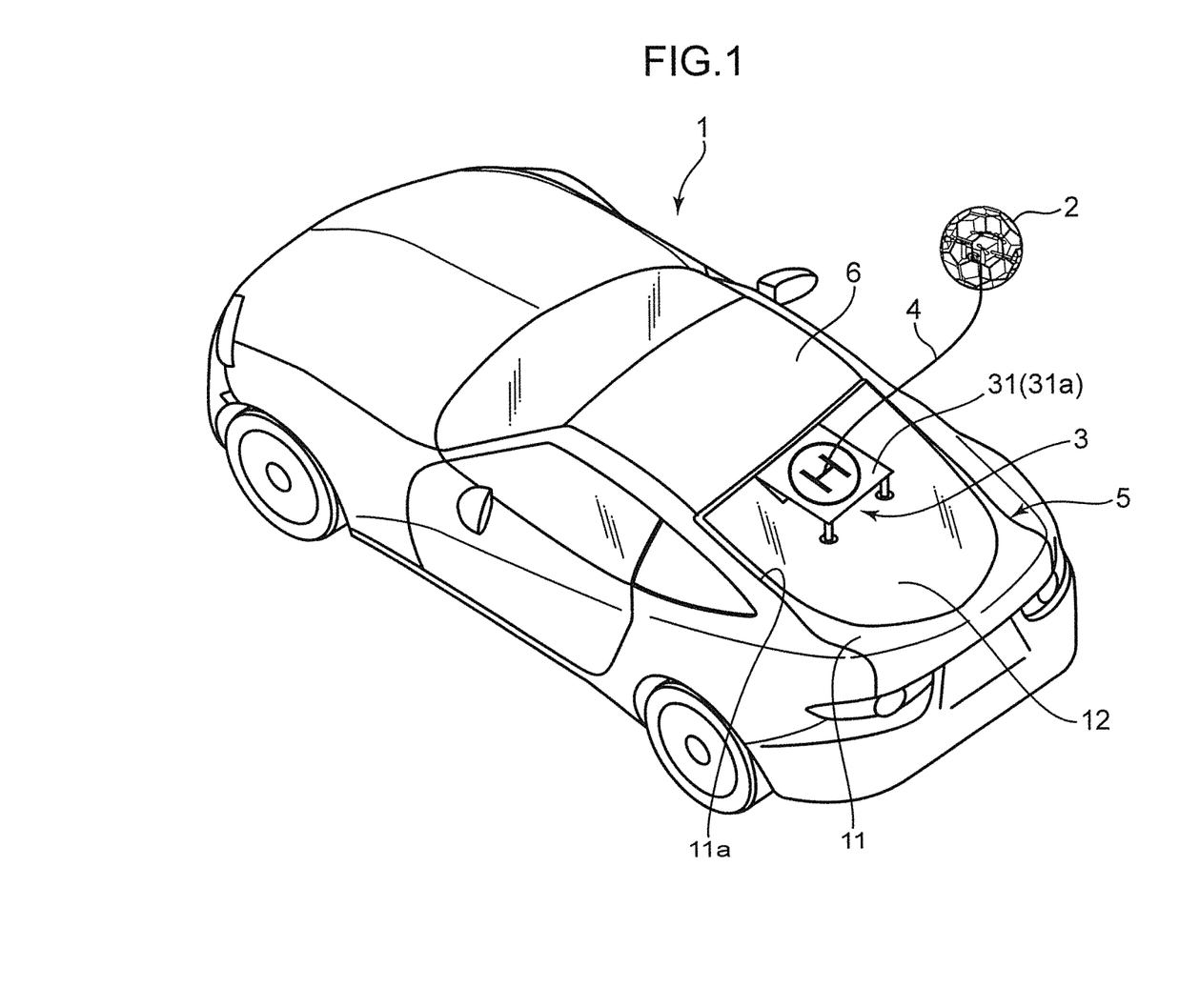
FIG. 1 is a perspective view showing appearance of a vehicle to which an on-vehicle aircraft control system according to one embodiment of the present invention is applied.

FIG. 1 is a perspective view showing appearance of a vehicle 1 to which an on-vehicle aircraft control system according to one embodiment of the present invention is applied. As shown in this figure, the vehicle 1 is equipped with an aircraft 2 capable of flying outside the vehicle 1. A landing platform 3 for the aircraft 2 to take off and land is detachably attached to the rear of the vehicle 1. The aircraft 2 is a lightweight unmanned aerial vehicle commonly referred to as a drone.

Figure 2:
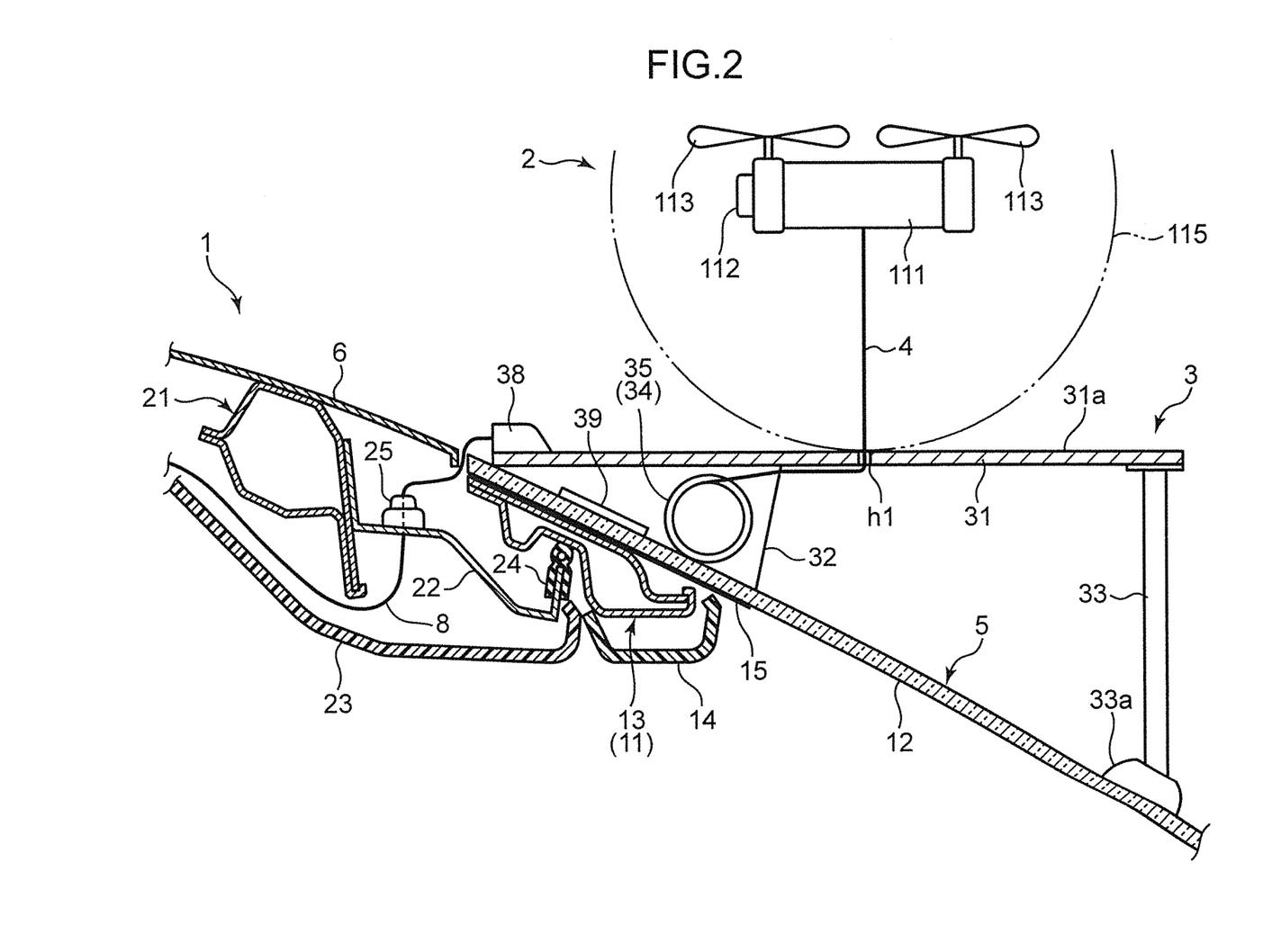
FIG. 2 is a sectional view showing a landing platform and a vehicle body structure in the vicinity thereof.

FIG. 2 is a sectional view showing the landing platform 3 and a vehicle body structure in the vicinity thereof. As shown in FIGS. 1 and 2, the vehicle 1 includes a roof panel 6 that covers an upper surface of a vehicle compartment, and a back door 5 that is connected to a rear edge of the roof panel 6.

The back door 5 is hinged to the rear edge of the roof panel 6 so as to rotate in a vertical direction, and covers a luggage compartment opening 11a formed at the rear of the vehicle 1 so as to be openable and closable. The back door 5 includes a frame-shaped door body 11 joined to the roof panel 6 and a transparent (or translucent) glass rear windshield 12 fixed to the door body 11 so as to cover a frame opening of the door body 11. The rear windshield 12 is attached to the door body 11 in an inclined attitude so as to become lower toward a rear side.

As shown in FIG. 2, a roof trim 23 constituting a ceiling surface of the vehicle compartment is attached below the roof panel 6. A roof header 21 and an extension member 22 extending in a vehicle width direction are disposed between rear ends of the roof panel 6 and the roof trim 23, respectively. The roof header 21 is a member having a predetermined closed section and extending in the vehicle width direction, and is joined to the rear end of the roof panel 6 so as to support the roof panel 6 from below. The extension member 22 is a member extending in the vehicle width direction behind the roof header 21, and is joined to a rear surface of the roof header 21.

An upper end frame 13 is provided below a front end (upper end) of the rear windshield 12. The upper end frame 13 is a member constituting an upper edge of the door body 11 (in other words, an upper window frame), and is formed so as to have a predetermined closed section and extend in the vehicle width direction. The upper end frame 13 is joined (adhered) to the front end of the rear windshield 12 so as to support the rear windshield 12 from below. Further below the upper end frame 13, a back door trim 14 that forms a design surface substantially continuous with a surface of the roof trim 23 is attached.

An area located on a lower surface of the front end of the rear windshield 12 and including a joined part with the upper end frame 13 described above is covered with a shield member 15 including a magnetic material. The shield member 15 is a sheet material that has both a function as a shield that prevents structures such as the upper end frame 13 from being visually recognized through the transparent (or translucent) rear windshield 12 and a function as a magnetic material that attracts and fixes a front end of the landing platform 3 (a magnet 39 described later).

The upper end frame 13 is joined to the extension member 22 via a door hinge (not shown). In other words, the back door 5 is attached to the vehicle body (roof) so as to be rotatable in the vertical direction with the door hinge provided between the upper end frame 13 and the extension member 22 as a fulcrum.

A weather strip 24 made of an elastic material such as rubber is attached to a rear end of the extension member 22. The weather strip 24 abuts on the upper end frame 13 when the back door 5 is closed to seal between the upper end frame 13 and the extension member 22.

Figure 3:
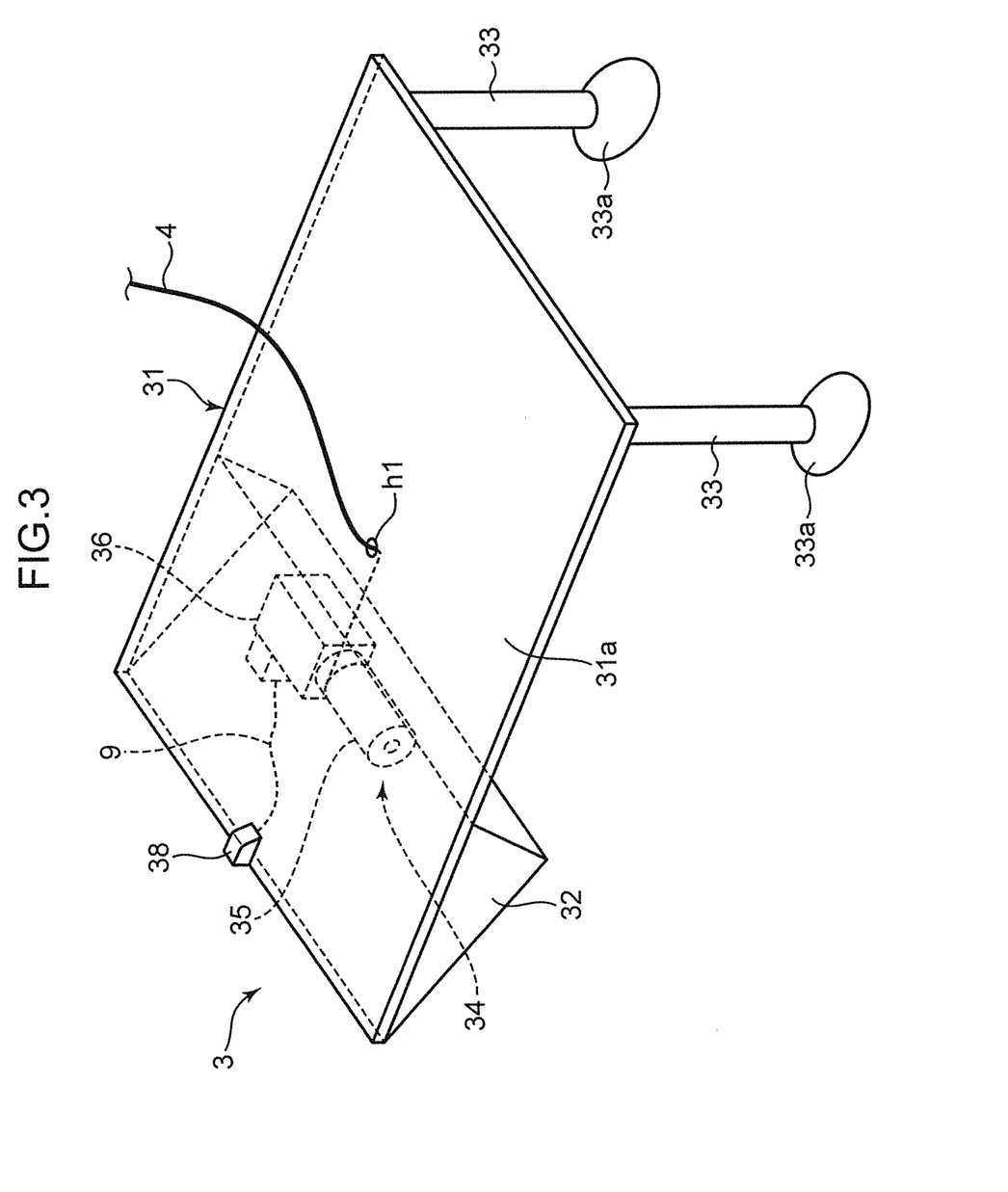
FIG. 3 is a perspective view of the landing platform alone.

FIG. 3 is a perspective view of the landing platform 3 alone. As shown in FIGS. 2 and 3, the landing platform 3 includes a platform member 31, a base 32, a pair of left and right legs 33, and a reel 34. The reel 34 corresponds to an example of a "winding device" in the present invention.

The platform member 31 is a flat plate-shaped member having a predetermined thickness. An upper surface 31a of the platform member 31 functions as a landing surface where the aircraft 2 takes off and lands. Hereinafter, the upper surface 31a of the platform member 31 is also referred to as a landing surface 31a. The landing surface 31a is a flat surface substantially parallel to a horizontal plane. A predetermined design pattern indicated as a place where the aircraft 2 takes off and lands may be illustrated on the landing surface 31a. FIG. 1 shows the design pattern of a circled letter H illustrated on the landing surface 31a as an example.

The base 32 is a hollow case attached to a lower surface of a front part of the platform member 31. The base 32 is formed such that a thickness increases toward the rear side so as to fill a clearance between the front part of the platform member 31 and the rear windshield 12.

The reel 34 is housed inside the base 32. Mainly as shown in FIG. 3, the reel 34 includes a cylindrical reel body 35 and an electric reel motor 36 that drives the reel body 35 to rotate. A tether 4 (FIGS. 1 to 3) is wound around the reel body 35, and the tether 4 is wound up around the reel body 35 or drawn out from the reel body 35 in accordance with a rotation of the reel body 35. A tip of the tether 4 (an end opposite to the reel body 35) is connected to the aircraft 2. The tether 4 corresponds to an example of a "connecting member" in the present invention.

The tether 4 is a flexible cable that has both a function as a tether (rope) connecting the aircraft 2 to the landing platform 3 and a function as a power line supplying electric power to the aircraft 2. The tether 4 is disposed so as to extend rearward from the reel 34 (reel body 35), penetrate an upper end of a rear wall of the base 32, and extend along the lower surface of the platform member 31. A guide hole h1 for passing the tether 4 is provided in a substantially center of the platform member 31 so as to penetrate the platform member 31. That is, the tether 4 drawn from the reel 34 is further drawn above the landing surface 31a through the guide hole h1 of the platform member 31, and is connected to the aircraft 2 above the landing surface 31a.

The reel 34 changes a drawing amount of the tether 4 in accordance with the launching and landing of the aircraft 2. That is, when the aircraft 2 takes off, the reel motor 36 is controlled such that the reel body 35 rotates in a drawing direction (a direction in which the tether 4 is drawn out), and the drawing amount of the tether 4 from the reel body 35 is increased. On the other hand, when the aircraft 2 lands, the reel motor 36 is driven such that the reel body 35 rotates in a winding direction (a direction in which the tether 4 is wound up), and the drawing amount of the tether 4 from the reel body 35 is reduced. As a result, it is possible to restrain the aircraft 2 so as to prevent a strong wind or the like from blowing away the aircraft 2 that has taken off while allowing the aircraft 2 to take off from and land on the landing platform 3. Further, at the time of landing of the aircraft 2, a position where the aircraft 2 lands on the landing surface 31a can be positioned near a center of the landing surface 31a where the guide hole h1 is formed.

The magnet 39 (FIG. 2) is attached to an upper surface of the bottom wall of the base 32. The magnet 39 is, for example, a plate-shaped strong magnet extending in the vehicle width direction (or a plurality of block-shaped strong magnets dispersed in the vehicle width direction), and is fixed to the bottom wall of the base 32 in an area on a front side of the reel 34. The magnet 39 serves to fix the base 32 to an upper surface of the rear windshield 12 by being attracted to the magnetic shield member 15.

The pair of left and right legs 33 are disposed so as to extend downward from both left and right sides of a rear end of the platform member 31. Each of the legs 33 has a suction part 33a at its lower end for detachably fixing each of the legs 33 to the rear windshield 12. As the suction part 33a, for example, a suction cup for glass that exhibits a strong suction force based on a vacuum can be used.

As described above, in the landing platform 3 according to the present embodiment, the base 32 located at the front is detachably fixed to the rear windshield 12 via the magnet 39, and the legs 33 located at the rear are detachably fixed to the rear windshield 12 via the suction parts 33a. That is, the landing platform 3 is attachable to and detachable from the rear windshield 12, and is manually removable from the rear windshield 12 when the aircraft 2 is not used.

A connector 38 is attached to the front end of the landing platform 3. As shown in FIG. 3, a relay cable 9 is disposed between the connector 38 and the reel motor 36 inside the base 32. The relay cable 9 is a multi-core cable including a power line that supplies electric power to the reel motor 36 and a power line that is connected to the tether 4 wound around the reel body 35 and supplies electric power to the aircraft 2 via the tether 4. Although not shown in FIG. 3, a signal line 9' (FIG. 5) for supplying a control signal to the reel motor 36 is disposed in parallel with the relay cable 9 between the connector 38 and the reel motor 36.

As shown in FIG. 2, a cable 8 extending from inside the vehicle 1 is detachably connected to a front end of the connector 38. The cable 8, which is detachably connected, can be drawn out from the connector 38 when the landing platform 3 is removed.

The cable 8 is a cable for supplying the electric power stored in a battery 41 (FIG. 5) in the vehicle 1, and is disposed so as to connect the battery 41 and the connector 38 to each other. That is, the cable 8 supplies the electric power of the battery 41 to the reel motor 36 via the connector 38 and the relay cable 9, and can supply the electric power of the battery 41 to the aircraft 2 via the connector 38, the relay cable 9, and the tether 4. Although now shown in FIG. 2, a signal line 8' (FIG. 5) for supplying a control signal to the reel motor 36 is also connected to the connector 38. This signal line 8' is detachably connected to the connector 38 in parallel with the cable 8. The cable 8 and the signal line 8' can be collectively connected to the connector 38 via, for example, a single terminal.

As shown in FIG. 2, the cable 8 is disposed so as to penetrate the extension member 22 slightly before the connector 38. A through hole (not shown) for passing the cable 8 is formed in a middle of the extension member 22 in a front-rear direction, and a grommet 25 for protecting the cable 8 is attached to a part corresponding to the through hole. The cable 8 penetrating the extension member 22 is led out of the vehicle 1 through the clearance between the roof panel 6 and the rear windshield 12, and is connected to the connector 38.

Figure 4:
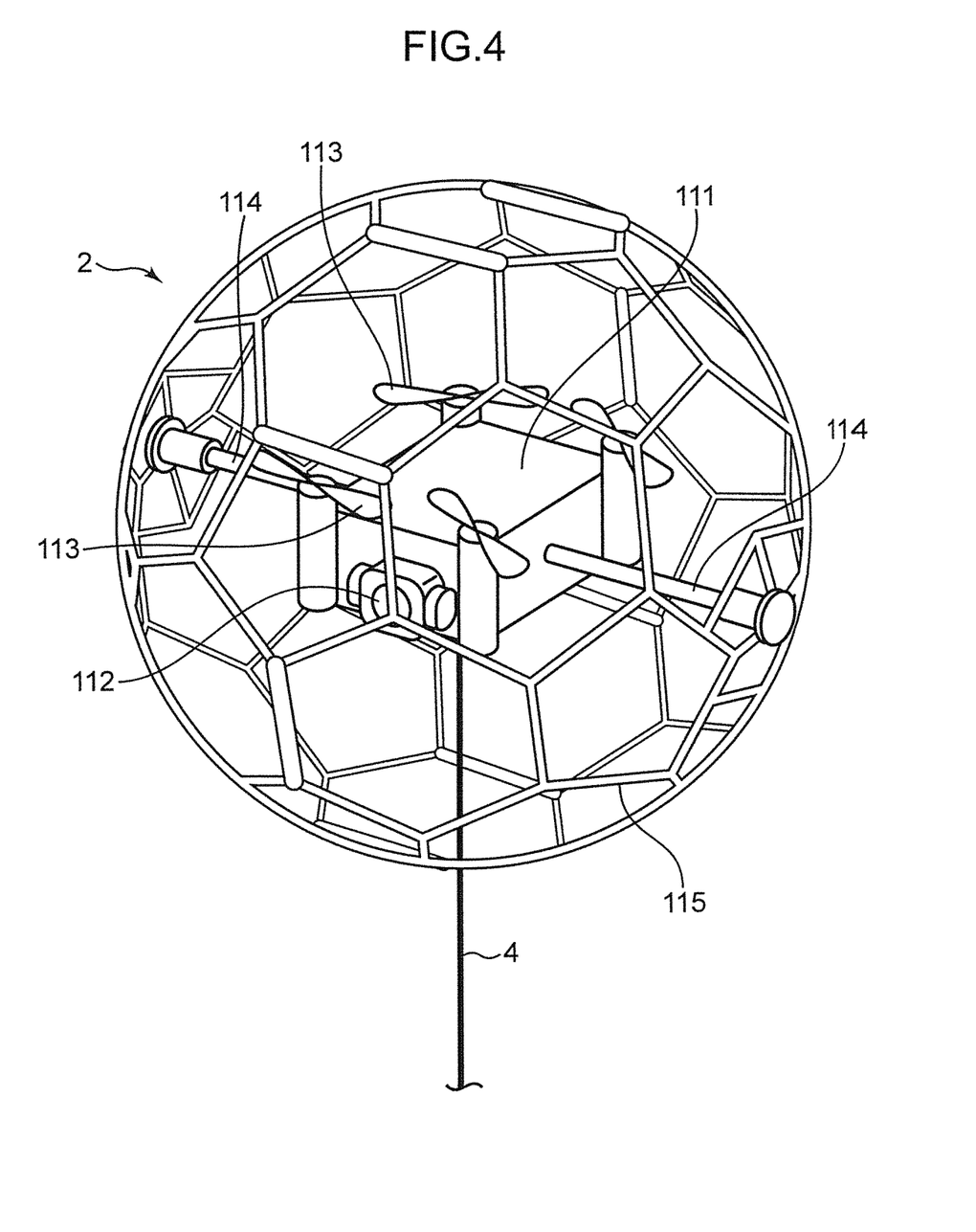
FIG. 4 is a perspective view showing appearance of the aircraft.

FIG. 4 is a perspective view showing appearance of the aircraft 2. As shown in FIGS. 2 and 4, the aircraft 2 is a so-called quadcopter drone, and includes a body 111, a camera 112 disposed on a front face of the body 111, four propellers 113 disposed at four corners of the body 111, a pair of shafts 114 extending laterally from the body 111, and a mesh spherical cushioning member 115 enclosing the body 111. The body 111 and the cushioning member 115 are connected to each other by the shafts 114. The above-described tether 4 is connected to a lower face of the body 111. In FIG. 2, the cushioning member 115 is simplified and represented by a two-dot chain line sphere.

The aircraft 2 flies with buoyancy due to a rotation of the propellers 113. The electric power for rotating the propellers 113, that is, the electric power for flying the aircraft 2, is supplied from the battery 41 in the vehicle 1 via the tether 4. Thus, in the present embodiment, mounting of a battery on the aircraft 2 is omitted, thereby reducing a weight of the aircraft 2. A total weight of the aircraft 2 is set to less than a weight limit (for example, 200 grams) subject to flight restrictions.

Figure 5:
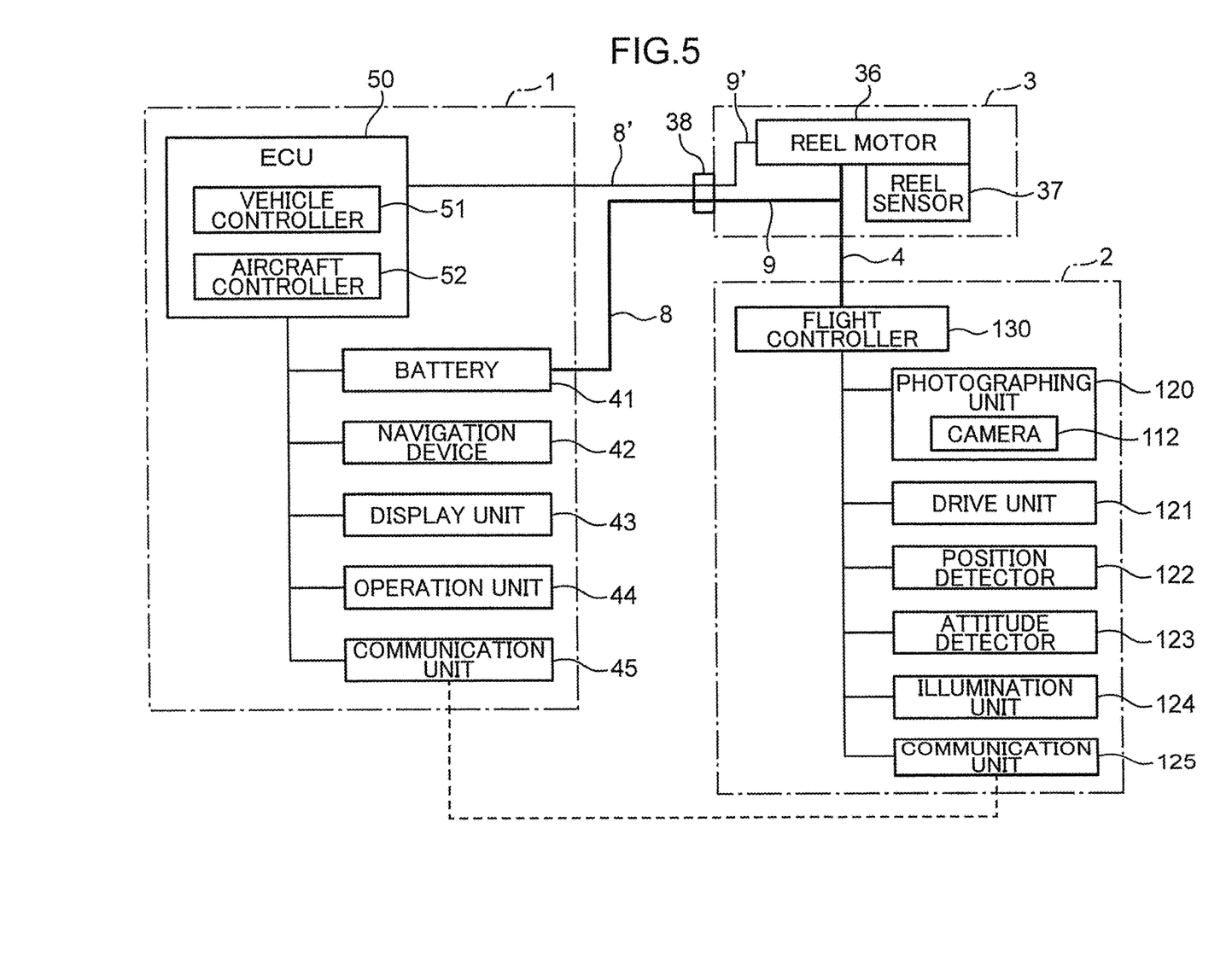
FIG. 5 is a block diagram showing functional configurations of the vehicle, the landing platform, and the aircraft.

FIG. 5 is a block diagram showing functional configurations of the vehicle 1, the landing platform 3, and the aircraft 2. As shown in this figure, the vehicle 1 includes a navigation device 42, a display unit 43, an operation unit 44, and a communication unit 45 in addition to the battery 41 described above. Further, the vehicle 1 includes an ECU 50 that comprehensively controls operations of these elements.

The ECU 50 is a microprocessor including a well-known CPU, ROM, RAM, and the like. The ECU 50 functionally has a vehicle controller 51 that controls an operation of the vehicle 1 and an aircraft controller 52 that controls an operation of the aircraft 2.

The navigation device 42 is a device that guides a route to a destination while identifying a traveling position of the own vehicle (the vehicle 1). The navigation device 42 has, for example, a GPS receiver that receives a signal representing position information transmitted from GPS satellites, a map data storage that stores data of a road map, traffic regulation information, and the like, a route guide that calculates an optimum travel route (recommended travel route) to a destination and presents the optimum travel route to the user when the destination is set by the user, and a display that displays information on the recommended travel route together with the road map.

The display unit 43 includes a display using an LCD, an organic EL, or the like. The display of the display unit 43 may also be used as a display included in the navigation device 42.

The operation unit 44 includes various switches capable of receiving manual operations by the occupant (driver or passenger) on the vehicle 1. The operation unit 44 includes, for example, any of a steering switch provided on a steering wheel, a console switch provided on a console part of the vehicle compartment, and a touch switch (touch screen) applied to the display of the display unit 43.

The communication unit 45 performs bidirectional data communication with the aircraft 2 (a communication unit 125 described later) by a short-range wireless communication system such as Bluetooth (registered trademark). The communication unit 45 can transmit a control signal (steering signal) for causing the aircraft 2 to perform a desired operation such as takeoff and landing to the aircraft 2, and also receive video data, position data, and attitude data transmitted from the aircraft 2.

The landing platform 3 includes a reel sensor 37 attached to the reel motor 36. The reel sensor 37 is a sensor that detects a rotation of the reel motor 36 and outputs a predetermined signal. The signal output from the reel sensor 37 includes a signal for identifying the drawing amount of the tether 4 from the reel body 35.

The aircraft 2 includes a photographing unit 120, a drive unit 121, a position detector 122, an attitude detector 123, an illumination unit 124, and the communication unit 125. Further, the aircraft 2 includes a flight controller 130 that comprehensively controls operations of these elements.

The flight controller 130 is a microprocessor including a well-known CPU, ROM, RAM, and the like. The flight controller 130 receives a command from the aircraft controller 52 of the vehicle 1 via the communication unit 125, and controls operations such as takeoff and landing of the aircraft 2 and photographing by the photographing unit 120 based on the received command. A combination of the flight controller 130 and the aircraft controller 52 corresponds to an example of a "controller" in the present invention.

The photographing unit 120 includes the camera 112 described above (see also FIG. 4) and an image processor that processes image data acquired by the camera 112. Images captured by the photographing unit 120 can include both a still image (photograph) and a moving image (video), but in the following, a case where a moving image is captured by the photographing unit 120 will be described as an example. The photographing unit 120 outputs captured moving image data (video data) in real time.

The drive unit 121 includes a motor for driving the four propellers 113 (FIG. 4) described above to rotate. The drive unit 121 individually controls a rotation direction and rotation speed of the four propellers 113. As a result, the aircraft 2 can perform arbitrary flight operations such as forward movement, backward movement, ascent, descent, turning, and hovering.

The position detector 122 includes a GPS receiver, an altitude sensor, and the like. The position detector 122 outputs the position data of the aircraft 2 identified from these elements in real time.

The attitude detector 123 includes an acceleration sensor, a gyro sensor, a magnetic direction sensor, and the like. The position detector 122 outputs the attitude data of the aircraft 2 identified from these elements in real time.

The illumination unit 124 includes a light source such as an LED disposed at a predetermined position of the body 111 of the aircraft 2.

The communication unit 125 performs bidirectional data communication with the communication unit 45 of the vehicle 1 described above by a short-range wireless communication system such as Bluetooth (registered trademark).

Figure 6:
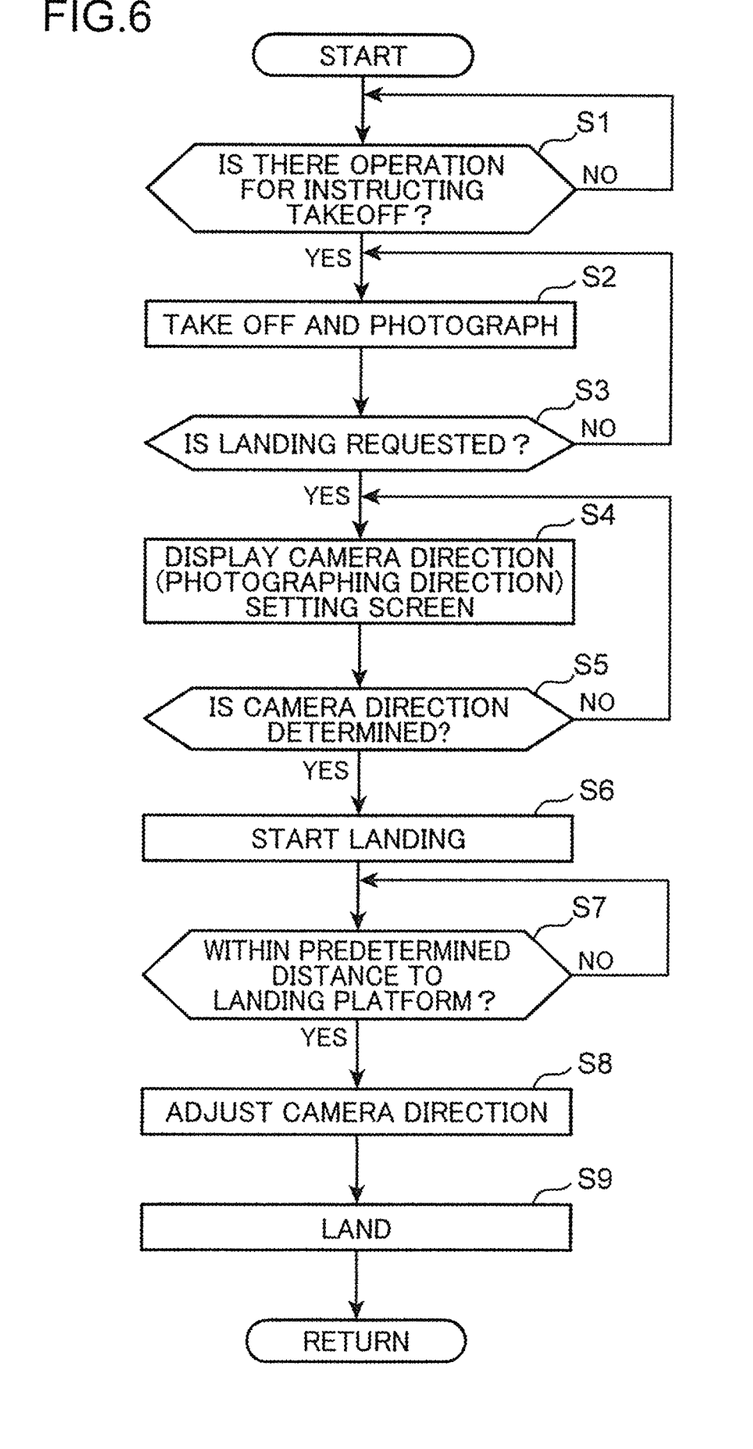
FIG. 6 is a flowchart showing an example of control for takeoff and landing of the aircraft.

FIG. 6 is a flowchart showing an example of control for takeoff and landing of the aircraft 2. When this control is started, the ECU 50 of the vehicle 1 determines in step S1 whether an operation of instructing the takeoff of the aircraft 2 has been performed by the occupant. Specifically, the ECU 50 determines whether a predetermined operation as an operation for instructing the takeoff of the aircraft 2 has been performed on the operation unit 44 based on an input signal from the operation unit 44.

If YES is determined in step S1 and it is confirmed that the operation for instructing the takeoff has been performed, the ECU 50 (aircraft controller 52) and the flight controller 130 cause the aircraft 2 to take off and photograph in the next step S2. That is, the ECU 50 (aircraft controller 52) outputs a command to take off and photograph to the flight controller 130 via the communication units 45 and 125. Upon receipt of the command, the flight controller 130 controls driving of the propellers 113 (drive unit 121) such that the aircraft 2 takes off from the landing platform 3 and flies over the vehicle 1, and the flight controller 130 also controls the photographing unit 120 (camera 112) to capture a specified video from above the vehicle 1. The ECU 50 (aircraft controller 52) also increases the drawing amount of the tether 4 by driving the reel motor 36 in the drawing direction such that the tether 4 is drawn from the reel 34 in accordance with the takeoff (elevation of altitude) of the aircraft 2. At this time, the drawing amount of the tether 4 is set such that a separation distance from the vehicle 1 (the landing platform 3) to the aircraft 2 does not exceed a predetermined upper limit value.

The video captured in step S2 is transmitted in real time via the communication units 45 and 125 and displayed on the display unit 43 in the vehicle. Various videos can be captured here. For example, it is conceivable to take a bird's-eye view of the vehicle 1 from above and behind, that is, a bird's-eye view of an area ahead of the vehicle 1 including the vehicle 1 itself from the sky. Such a video (hereinafter referred to as a vehicle bird's-eye view video) can be captured by controlling the aircraft 2 so as to fly above and behind the vehicle 1 and directing a direction (photographing direction) of the camera 112 of the aircraft 2 forward and downward. By displaying such a vehicle bird's-eye view video on the display unit 43, the occupant can confirm a traveling state of the vehicle 1 driven (boarded) by the occupant as if overlooking from the sky. The video captured by the photographing unit 120 (camera 112) can be not only displayed on the display unit 43 but also stored in a predetermined storage medium. The storage medium storing the video may be an internal storage medium provided in the navigation device 42 or the like, or an external storage medium such as a USB memory.

The ECU 50 then determines in step S3 whether the landing of the aircraft 2 is requested. Specifically, the ECU 50 determines that the landing of the aircraft 2 is requested when any of the following conditions (i) and (ii) is satisfied.

(i) The occupant has performed an operation of instructing the landing of the aircraft 2. That is, a predetermined operation as an operation of instructing the landing of the aircraft 2 has been performed on the operation unit 44.

(ii) The vehicle 1 is entering a predetermined flight restricted area that interferes with the flight of the aircraft 2. Here, examples of the flight restricted area include a tunnel section passing through a tunnel and an area around an airport. In the tunnel section, the aircraft 2 may collide with a wall of the tunnel, and in the area around the airport, the flight of the aircraft 2 may be prohibited by the aviation law. Thus, it can be determined that the aircraft 2 needs to land when the vehicle 1 approaches the tunnel section or the area around the airport to some extent. Such a determination can be made based on the map data stored in the navigation device 42, the position data of the vehicle 1, and the like.

If it is confirmed in step S3 that either of the condition (i) or (ii) above is satisfied, that is, if there is a landing request for the aircraft 2, then, in the next step S4, the ECU 50 displays, on the display unit 43 in the vehicle 1, a display that requests the occupant to decide in which direction the camera 112 of the photographing unit 120 (specifically, a lens unit of the camera 112) is to be directed with respect to the vehicle 1 at a time of the landing of the aircraft 2 (hereinafter referred to as a photographing direction setting screen). Various specific contents of the photographing direction setting screen can be considered. When the display of the display unit 43 is also used as the display provided in the navigation device 42, for example, it is conceivable to display, as the photographing direction setting screen, a combination of four icons respectively representing "front", "rear", "left", and "right" directions and a message explaining that the photographing direction after landing is set by selecting one of the icons on the display.

The occupant who sees the photographing direction setting screen can set the photographing direction by using the operation unit 44. For example, when the four icons respectively representing the "front", "rear", "left", and "right" directions as described above are displayed on the display unit 43, the occupant can set the photographing direction after landing by selecting one of these icons using the operation unit 44. Various specific operation methods can be considered. For example, when the operation unit 44 is a touch switch applied to the display of the display unit 43, the occupant can set the photographing direction after landing by touching any of the icons on the display. When the operation unit 44 is a steering switch or a console switch, the occupant can set the photographing direction after landing by operating the switch to select and decide any of the icons.

Next, the ECU 50 determines in step S5 whether the photographing direction after landing, that is, the direction in which the photographing unit 120 (camera 112) is to be directed at the time of landing of the aircraft 2 is decided. The photographing direction after landing decided in step S5 is hereinafter referred to as a specified photographing direction.

Specifically, in step S5, the ECU 50 determines that the specified photographing direction has been determined when either (a) or (b) is satisfied, where (a) is that the occupant has performed an operation of setting the photographing direction using the operation unit 44 and (b) is that a predetermined time has passed from a start of displaying the photographing direction setting screen. That is, in a case of (a), the direction set by the operation of the operation unit 44 (the direction selected by the occupant) is decided as the specified photographing direction. On the other hand, in a case of (b), a predetermined direction as a default is decided as the specified photographing direction. This means that when the operation of setting the photographing direction is not performed by the operation unit 44 for a predetermined time, the predetermined default direction is forcibly set as the specified photographing direction. The default photographing direction may be any of front, rear, left, or right with respect to the vehicle 1. However, for example, when the area ahead of the vehicle 1 (a video of the vehicle 1 overlooked from above and behind) is photographed during the flight of the aircraft 2 (step S2), it is conceivable that the default photographing direction is set to "front" with respect to the vehicle 1. When the default photographing direction is set to "front", the video captured by the photographing unit 120 after the landing of the aircraft 2 is a video facing forward through the roof of the vehicle 1.

The ECU 50 (aircraft controller 52) and the flight controller 130 cause the aircraft 2 to start landing in the next step S6. That is, the ECU 50 (aircraft controller 52) outputs a command to start landing to the flight controller 130 via the communication units 45 and 125. Upon receipt of the command, the flight controller 130 controls the propellers 113 (drive unit 121) in a direction in which the aircraft 2 approaches the landing platform 3 (a direction in which the altitude decreases). Further, the ECU 50 (aircraft controller 52) reduces the drawing amount of the tether 4 by driving the reel motor 36 in the winding direction such that the tether 4 is wound up around the reel 34 as the altitude of the aircraft 2 decreases.

Next, the ECU 50 (aircraft controller 52) determines in step S7 whether a distance between the aircraft 2 and the landing platform 3 (landing surface 31a) is equal to or less than a predetermined distance. Specifically, the ECU 50 identifies a separation distance from the landing surface 31a to the aircraft 2 (more specifically, a separation distance to a lower end of the cushioning member 115 of the aircraft 2) based on a detection value of the reel sensor 37, and determines whether the identified separation distance has decreased to less than or equal to the predetermined distance. The predetermined distance used as a threshold value here can be set to, for example, about 10 cm.

If YES is determined in step S7 and it is confirmed that the separation distance from the landing platform 3 to the aircraft 2 is less than or equal to the predetermined distance, the ECU 50 (aircraft controller 52) and the flight controller 130 adjusts in the next step S8 the direction of the photographing unit 120 (camera 112) of the aircraft 2 in accordance with the specified photographing direction determined in step S5. That is, the ECU 50 (aircraft controller 52) outputs a command to the flight controller 130 via the communication units 45 and 125 that an attitude of the aircraft 2 is to be adjusted such that the camera 112 faces in the specified photographing direction. Upon receipt of the command, the flight controller 130 drives the propellers 113 (drive unit 121) and adjust the attitude of the aircraft 2 such that the photographing direction, which is a direction in which the lens unit of the camera 112 faces (a direction of a center line of a photographing field of view), matches the specified photographing direction. For example, when the specified photographing direction decided in step S5 is "front", the flight controller 130 adjusts the attitude of the aircraft 2 such that the lens unit of the camera 112 faces toward ahead of the vehicle 1 based on information detected by the attitude detector 123.

Specifically, the flight controller 130 identifies the photographing direction of the camera 112 with respect to the earth based on signals from the magnetic direction sensor and the gyro sensor included in the attitude detector 123, and also compares the identified photographing direction of the camera and a traveling direction of the vehicle 1 identified by the GPS receiver of the navigation device 42 to adjust the photographing direction of the camera 112 with respect to the vehicle 1. For example, when the specified photographing direction is "front" and the traveling direction of the vehicle 1 is "north", the flight controller 130 adjusts the attitude of the aircraft 2 such that the lens unit of the camera 112 faces toward "north", which is the traveling direction of the vehicle 1, to match the photographing direction of the camera 112 with the specified photographing direction (front).

Next, the ECU 50 (aircraft controller 52) and the flight controller 130 cause the aircraft 2 to land on the landing platform 3 in step S9. That is, the ECU 50 (aircraft controller 52) outputs a command to complete landing to the flight controller 130 via the communication units 45 and 125. Upon receipt of the command, the flight controller 130 controls the propellers 113 (drive unit 121) such that the altitude of the aircraft 2 is lowered until the aircraft 2 reaches the landing platform 3 (until the distance between the aircraft 2 and the landing surface 31a becomes zero), and the flight controller 130 stops the propellers 113 when the aircraft 2 reaches the landing platform 3. Further, the ECU 50 (aircraft controller 52) reduces the drawing amount of the tether 4 by driving the reel motor 36 in the winding direction such that the tether 4 is wound up around the reel 34 as the altitude of the aircraft 2 decreases. By winding the reel 34, the tether 4 is stretched between the aircraft 2 which has completed landing (the aircraft 2 located on the landing surface 31a) and the reel 34, thereby causing the tether 4 to have a predetermined tension. This tension restrains the aircraft 2 at a predetermined landing position on the landing surface 31a. Specifically, the aircraft 2 is restrained directly above the guide hole h1 (FIG. 2), which is a position where the tether 4 is drawn from the landing surface 31a.

Although not shown in FIG. 6, even after the aircraft 2 lands on the landing platform 3, in principle, the photographing unit 120 continues photographing (for example, unless the occupant performs a specific operation to stop the photographing). Further, if a predetermined permission condition such as the vehicle 1 leaving the flight restricted area is satisfied during the photographing (that is, during the photographing by the aircraft 2 which has landed), the aircraft 2 is controlled to take off again from the landing platform 3, and the control to photograph the vehicle 1 from the sky is performed again.

As described above, in the present embodiment, when there is a landing request for landing the aircraft 2 on the landing platform 3, the tether 4 connected to the aircraft 2 is wound by the reel 34, and the attitude of the aircraft 2 is controlled such that the aircraft 2 lands on the landing platform 3 with the photographing unit 120 (camera 112) of the aircraft 2 facing in the specified photographing direction determined in advance. In this configuration, there is an advantage that it is possible to prevent the photographing direction from varying when the aircraft 2 performs photographing after landing.

That is, in the above embodiment, because the tether 4 is wound up when the aircraft 2 lands, the tether 4 that has been wound up can restrain the aircraft 2, bring the aircraft 2 close to the landing platform 3, and land the aircraft 2 at a stable position on the landing platform 3. Furthermore, the attitude of the aircraft 2 is adjusted such that the photographing unit 120 faces in the predetermined photographing direction (specified photographing direction) at the time of landing. It is therefore possible to prevent the photographing direction from varying when the photographing unit 120 performs photographing after landing. As a result, a useful video can be acquired from the photographing unit 120 not only during the flight but also after landing of the aircraft 2, and the aircraft 2 can be utilized more widely.

Further, in the above embodiment, when it is confirmed based on the detection value of the reel sensor 37 that the distance between the aircraft 2 during the landing operation and the landing platform 3 (landing surface 31*a*) is equal to or less than a predetermined distance, the attitude of the aircraft 2 is adjusted such that the photographing unit 120 faces in the specified photographing direction. Thus, the direction of the photographing unit 120 can be adjusted when the aircraft 2 approaches the landing platform 3 to a certain distance. It is therefore possible to further stabilize the photographing direction when photographing is performed after landing.

Further, in the above embodiment, the specified photographing direction can be variably set with respect to the vehicle 1 by operating the operation unit 44. Thus, which direction of the video is to be acquired after the landing of the aircraft 2 can be determined in accordance with a preference of the occupant, thereby improving convenience of the aircraft 2.

Specifically, in the above embodiment, a predetermined display (photographing direction setting screen) including a plurality of options as candidates for the specified photographing direction is displayed on the display unit 43 in response to the landing request for landing the aircraft 2. Thus, the occupant can appropriately set the photographing direction after landing by a simple operation (operation of selecting an option) according to the display.

In the above embodiment, if the operation of setting the specified photographing direction (photographing direction after landing) is not performed within a predetermined time after the landing request of the aircraft 2, the specified photographing direction is set to the predetermined default direction (for example, "front"). However, this default direction may be further changeable by a predetermined operation. For example, it is considered that some users preferentially use the aircraft 2 (photographing unit 120) as a substitute for a so-called rear drive recorder that photographs a vehicle following the own vehicle. For such users, it is more convenient for the default photographing direction to be "rear". Making the default photographing direction variable leads to improving the convenience of the aircraft 2 for such users. That is, if the default photographing direction is variable, the user can set the default photographing direction to a desired direction in accordance with a main purpose of using the aircraft 2, thereby further improving the convenience of the aircraft 2.

On the contrary, in a vehicle in which the purpose of photographing using the aircraft 2 (photographing unit 120) is limited, it is sufficient that the photographing unit 120 is always directed in a direction corresponding to the purpose. Thus, an aircraft mounted on such a vehicle is not required to take measures in which the specified photographing direction is changeable (the user is allowed to select the photographing direction). In this case, the specified photographing direction may be appropriately set in accordance with the limited purpose, and may be any of the front, rear, left, or right of the vehicle.

Further, although not specifically mentioned in the above embodiment, it is assumed that the occupant wishes to newly photograph in another direction when the aircraft 2 is landing and the photographing unit 120 is performing photographing. In order to meet a demand of the occupant in such a situation, the operation unit 44 or the like may be configured so as to be able to accept a predetermined operation of changing the photographing direction after landing. In this case, the occupant changes the photographing direction by performing a predetermined operation using the operation unit 44 or the like when the aircraft 2 has already landed. Upon receipt of this operation, the aircraft 2 takes off from the landing platform 3 for a short distance, changes the attitude in accordance with a new photographing direction in that state, and then lands on the landing platform 3. As a result, the attitude of the aircraft 2 on the landing platform 3 is changed, and the video in the newly set photographing direction can be acquired.

Further, in the above embodiment, the control for adjusting the attitude of the aircraft 2, that is, the control for adjusting the attitude of the aircraft 2 to match the photographing direction of the photographing unit 120 with the specified photographing direction determined in advance (step S8) is performed based on the information detected by the attitude detector 123 (the magnetic direction sensor, the gyro sensor, and the like) provided in the aircraft 2. Alternatively, instead of this control, the attitude of the aircraft 2 may be adjusted by recognizing the attitude (direction) of the aircraft 2 with respect to the vehicle 1 based on the video captured by the photographing unit 120. For example, when the specified photographing direction is "front", the front of the vehicle 1 is identified from the video of the vehicle 1 or the landing platform 3 captured by the photographing unit 120, and then the attitude of the aircraft 2 is adjusted so as to match the identified front of the vehicle 1 with the photographing direction of the photographing unit 120. At this time, it is conceivable to attach a directional symbol (for example, an arrow symbol) to the vehicle 1 or the landing platform 3 such that the direction with respect to the vehicle 1 (front, rear, left, or right of the vehicle 1) can be easily recognized. Specifically, if an arrow symbol whose tip points to the front of the vehicle 1 is attached to the vehicle 1 or the landing platform 3, the direction in which the tip of the arrow symbol points can be recognized as "front" of the vehicle 1.

Further, in the above embodiment, a front of the landing platform 3 is detachably fixed to the vehicle body (rear windshield 12) by using the magnet 39. Alternatively, the front of the landing platform 3 may be detachably fixed to the vehicle body by providing a locking member such as a hook at the front end of the landing platform 3 and locking the locking member to a locked part such as a recess formed at the rear end of the roof panel 6.

Further, in the above embodiment, the reel 34 is disposed below the front of the platform member 31. Alternatively, the reel can be disposed at an arbitrary position of the landing platform, and may be disposed, for example, below the center or a rear of the platform member 31.

Further, in the above embodiment, the cable 8 for supplying electric power to components such as the reel motor 36 provided in the landing platform 3 is introduced from outside the vehicle to inside the vehicle through the clearance between the roof panel 6 and the rear windshield 12. It is not essential, however, to introduce the cable for the landing platform 3 into the vehicle. For example, in many recent vehicles, a fin-shaped component (so-called shark antenna) having an antenna for receiving various radio waves is attached to the rear end of the roof panel 6. It is therefore conceivable to provide an outlet for receiving signals and electric power on a rear end surface of such a shark antenna and to insert the cable for the landing platform 3 into the outlet. This eliminates the need for introducing the cable for the landing platform 3 into the vehicle.

Further, in the above embodiment, electric power is supplied from the vehicle 1 to the aircraft 2 through the tether 4 connecting the reel 34 and the aircraft 2, and the control signal is exchanged between the aircraft 2 and the vehicle 1 wirelessly via the communication units 45 and 125. Alternatively, the control signal may be exchanged by wire by adding a function as a signal line to the tether. On the contrary, by incorporating a battery in the aircraft and wirelessly exchanging the control signal between the aircraft and the vehicle, the function as a power line and a signal line can be omitted from the tether, and the aircraft and the reel can be connected with a pure tether (simply a flexible wire).

Further, in the above embodiment, the reel sensor 37 determines timing for adjusting the attitude of the aircraft 2 at the time of landing, that is, determines how close the aircraft 2 is to the landing platform 3 to adjust the attitude of the aircraft 2 based on the drawing amount of the tether 4 identified from the detection value of the reel sensor 37. Alternatively, the timing can be determined based on information detected by the position detector 122 depending on accuracy of the position detector 122 provided in the aircraft 2.

Summary of Embodiment

Provided is an on-vehicle aircraft control system configured to control an aircraft that is capable of taking off from and landing on a landing platform provided on a vehicle and includes a photographing unit. The control system includes a winding device provided on the landing platform, a connecting member connecting the winding device and the aircraft and wound up or drawn out by the winding device, and a controller configured to control the winding device and the aircraft. Upon receipt of a landing request for landing the aircraft on the landing platform, the controller winds up the connecting member by the winding device and controls an attitude of the aircraft for the aircraft to land on the landing platform with the photographing unit facing in a specified photographing direction determined in advance.

In this configuration, because the connecting member connecting the winding device and the aircraft is wound up when the aircraft lands, the connecting member that has been wound up can restrain the aircraft, bring the aircraft close to the landing platform, and land the aircraft at a stable position on the landing platform. Furthermore, the attitude of the aircraft is adjusted such that the photographing unit faces in the predetermined photographing direction (specified photographing direction) at the time of landing. It is therefore possible to prevent the photographing direction from varying when the photographing unit performs photographing after landing. As a result, a useful image can be acquired from the photographing unit not only during the flight but also after landing of the aircraft, and the aircraft can be utilized more widely.

In a preferred embodiment, the control system further includes a sensor configured to detect a separation distance from the landing platform to the aircraft. After receipt of the landing request, the controller controls the attitude of the aircraft such that the photographing unit faces in the specified photographing direction when the separation distance detected by the sensor decreases to less than or equal to a predetermined distance.

In this configuration, the photographing direction of the photographing unit is adjusted when the sensor confirms that the aircraft has approached the landing platform to a certain distance. It is therefore possible to further stabilize the photographing direction when photographing is performed after landing.

In a preferred embodiment, the control system further includes an operation unit configured to receive an operation to change the specified photographing direction by an occupant.

In this configuration, which direction of the image is to be acquired after the landing of the aircraft can be determined in accordance with a preference of the occupant, thereby improving convenience of the aircraft.

In a preferred embodiment, the control system further includes a display unit configured to present various types of information to the occupant. Upon receipt of the landing request, the controller displays a plurality of options selectable by the occupant as the specified photographing direction on the display unit.

In this configuration, the occupant can select a preferred photographing direction from the plurality of options, and can set the photographing direction after landing by a simple operation.

This application is based on Japanese Patent application No. 2020-087575 filed in Japan Patent Office on May 19, 2020, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An on-vehicle aircraft control system configured to control an aircraft that is capable of taking off from and landing on a landing platform provided on a vehicle and includes a camera, the on-vehicle aircraft control system comprising:
   a winding device provided on the landing platform;
   a connecting member connecting the winding device and the aircraft and wound up or drawn out by the winding device;
   a display configured to present various types of information to an occupant; and
   a controller configured to control the winding device, the display, and the aircraft, wherein
   upon receipt of a landing request for landing the aircraft on the landing platform, the controller controls the winding device to wind up the connecting member and controls an attitude of the aircraft for the aircraft to land on the landing platform with the camera facing in a specified photographing direction determined in advance, the specified photographing direction being changeable according to an operation by the occupant,
   the controller controls the display to display a photographing direction setting screen as a display requesting the occupant to determine in which direction the camera is to be directed with respect to a vehicle upon receipt of the landing request, and
   the photographing direction setting screen includes four icons respectively representing front, rear, left, and right directions selectable by the occupant as the specified photographing direction, and a message explaining that a photographing direction after landing is set by selecting any of the four icons.

2. The on-vehicle aircraft control system according to claim 1, further comprising a sensor configured to detect a separation distance from the landing platform to the aircraft,
   wherein after receipt of the landing request, the controller controls the attitude of the aircraft such that the camera faces in the specified photographing direction when the separation distance detected by the sensor decreases to less than or equal to a predetermined distance.

3. The on-vehicle aircraft control system according to claim 2, wherein the aircraft includes a plurality of propellers and a drive unit including a motor configured to drive the plurality of propellers, the camera includes a lens unit, the controller includes an aircraft controller provided in the vehicle and a flight controller provided in the aircraft, and the flight controller controls the drive unit to drive the plurality of propellers and adjusts the attitude of the aircraft so as to match a photographing direction in which the lens unit of the camera faces with the specified photographing direction in response to a command from the aircraft controller that has received the landing request.

4. The on-vehicle aircraft control system according to claim 3, wherein the vehicle includes a navigation device including a GPS receiver, and the aircraft includes an attitude detector including at least one of a magnetic direction sensor and a gyro sensor, and the flight controller identifies the photographing direction of the camera with respect to earth based on a signal from the attitude detector, compares the photographing direction of the camera and a traveling direction of the vehicle identified by the navigation device, and adjusts the photographing direction of the camera with respect to the vehicle.

5. The on-vehicle aircraft control system according to claim 1, wherein the aircraft includes a pair of shafts extending laterally from a body of the aircraft, and a mesh spherical cushioning structure enclosing the body, the body and the spherical cushioning structure being connected to each other by the pair of shafts.

6. The on-vehicle aircraft control system according to claim 1, wherein the controller is configured to determine that the landing request is received under a condition where the vehicle is entering a predetermined flight restricted area that interferes with flying of the aircraft.

7. The on-vehicle aircraft control system according to claim 6, wherein the controller is configured to control the aircraft to take off from the landing platform under a condition where the vehicle leaves the predetermined flight restricted area.

* * * * *